Feb. 13, 1945.  V. LOBASSO  2,369,305
FRUIT JUICE EXTRACTOR
Filed March 5, 1942  3 Sheets-Sheet 3

INVENTOR.
VINCENT LOBASSO
BY
ATTORNEYS

Patented Feb. 13, 1945

2,369,305

UNITED STATES PATENT OFFICE 2,369,305

FRUIT JUICE EXTRACTOR

Vincent Lobasso, New York, N. Y., assignor to George J. Rosenfeld, New York, N. Y.

Application March 5, 1942, Serial No. 433,436

2 Claims. (Cl. 100—39)

This invention relates to improvements in fruit juice extractors and has particular reference to an apparatus wherein fruit is fed to cooperating compressor elements which are automatically controlled to extract juice from the fruit and to discharge the compressed fruit therefrom.

An object of the invention is to provide an improved apparatus of simple and practical construction in which a fruit is compressed by the action of two compressor elements, one of which is thereafter operated to discharge the compressed fruit therefrom.

Another object is to control, from a single source of power, the extraction of juice from a fruit by the cooperation of compressor elements, the discharge of the compressed fruit from said elements, and the dispensation of measured quantities of the extracted juice into a series of individual receptacles.

The above and other objects will appear more clearly from the following detailed description when taken in connection with the accompanying drawings which illustrate a preferred embodiment of the inventive idea.

In the drawings—

Fig. 4 is an enlarged vertical section through the reservoir in which the juice from extracted fruit is accumulated and from which said juice is dispensed in measured quantities, and Fig. 5 is a fragmentary detailed sectional view of the turntable used for dispensing the extracted juice into a series of individual receptacles.

Figure 1:
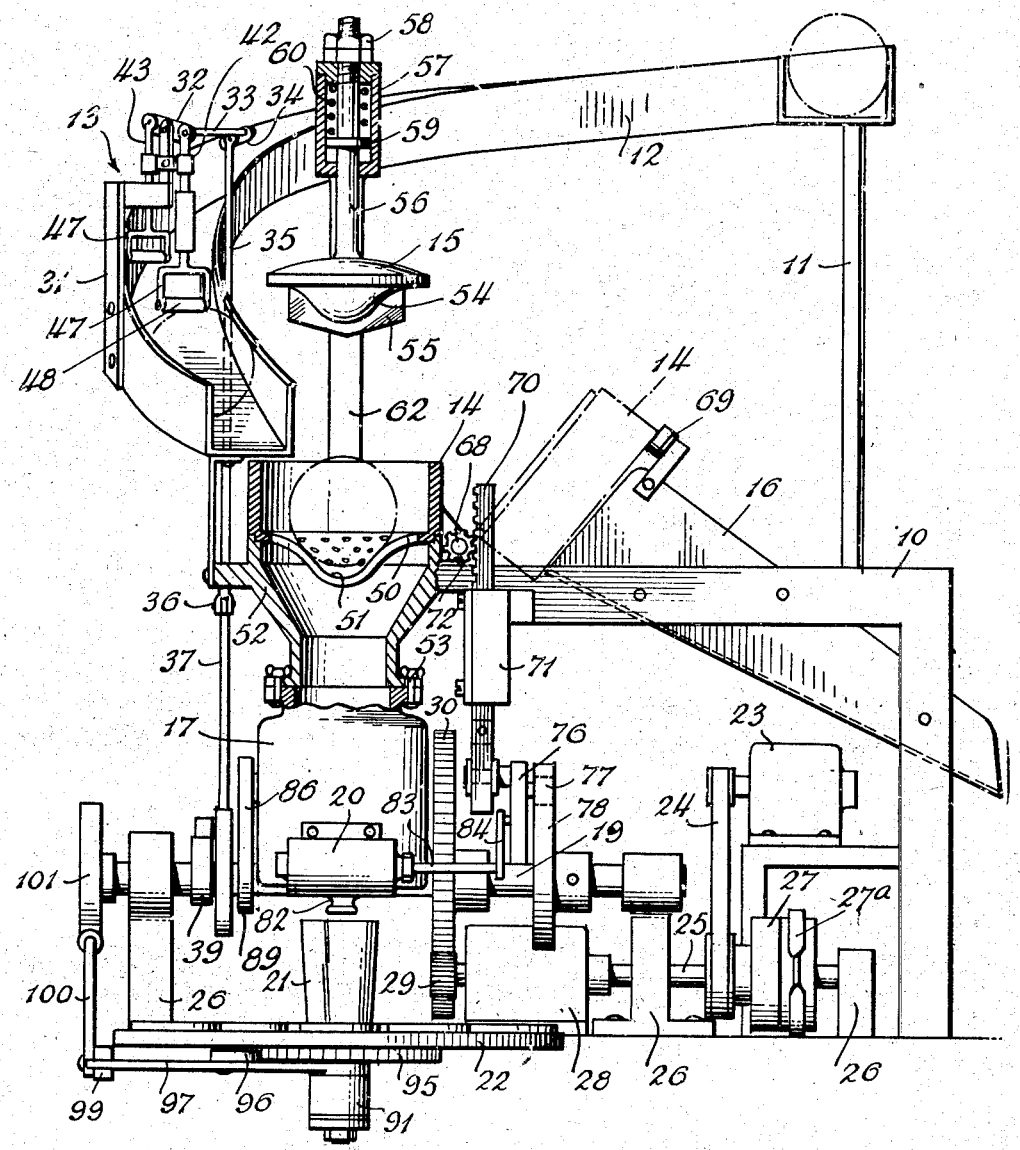
Fig. 1 is a front elevation, partly in section, of the apparatus constructed in accordance with the invention.

Briefly, the invention is shown as comprising a frame-work 10 above which is supported, by a standard 11, a curved delivery chute 12 into which fruit, such as oranges, are fed and advanced, by the inclination of the chute, to an escapement mechanism generally indicated by the numeral 13. This mechanism operates to deliver the oranges, one by one, to a pivotally mounted compressor element 14 which cooperates with a vertically movable compressor element 15 to compress the fruit within the element 14 and thus extract the juice therefrom. At the termination of such compression operation and subsequent separation of the compressor elements, the element 14 is swung about its pivot to the dotted line position of Fig. 1 to deposit the pressed fruit into the discharge chute 16, after which said element 14 is returned to its normal, operative position to receive another fruit from the chute 12. The extracted juice flows from the element 14 into a reservoir 17 where the juice is stirred by a constantly driven agitator 18 (Fig. 4) operated from the main shaft 19. The movement of the compressor element 14 to its discharge position and return, is controlled from the main shaft 19 and the mechanism for accomplishing the movement of said compressor element is also utilized to operate a valve structure 20 associated with the reservoir 17 and periodically operated to discharge a measured quantity of juice from said reservoir into a plurality of individual receptacles 21 mounted upon a turntable 22. This turntable is also operated from the main shaft 19 in a step-by-step or intermittent rotary movement to successively position the receptacles 21 beneath the valve structure 20.

A prime mover, such as an electrical motor 23 supported upon the frame 10, is employed to perform the various functions described while the apparatus is in operation. The drive from the motor is through the endless belt 24 to the countershaft 25 mounted in bearings 26 and having thereon, if desired, a clutch conventionally shown at 27 and provided with a control lever 27a. The shaft 25 is also coupled to a gear reduction 28 of standard construction to operate a small gear 29 which meshes with the master gear 30 mounted upon the shaft 19.

Figure 2:
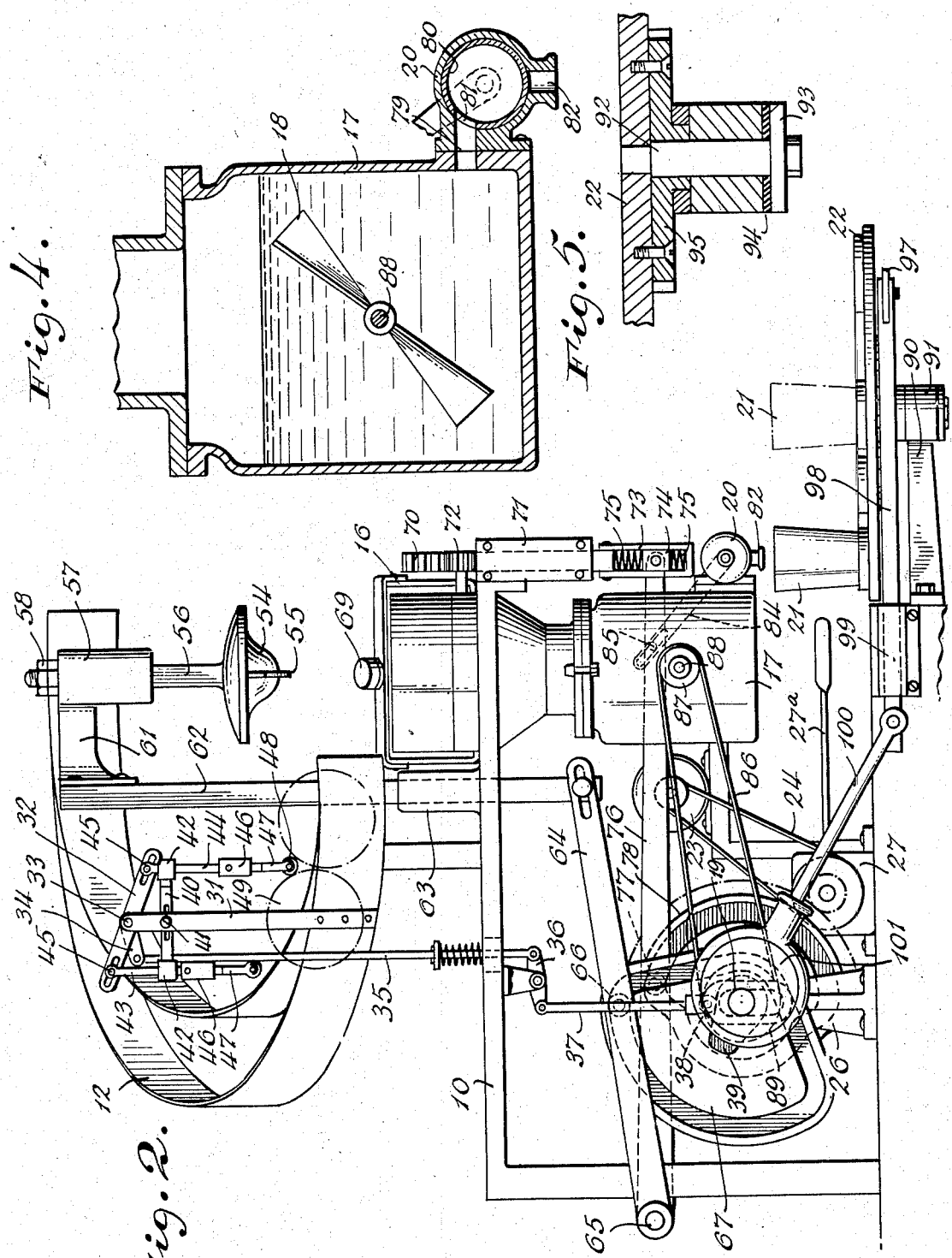
Fig. 2 is a side elevation thereof.
Figure 3:
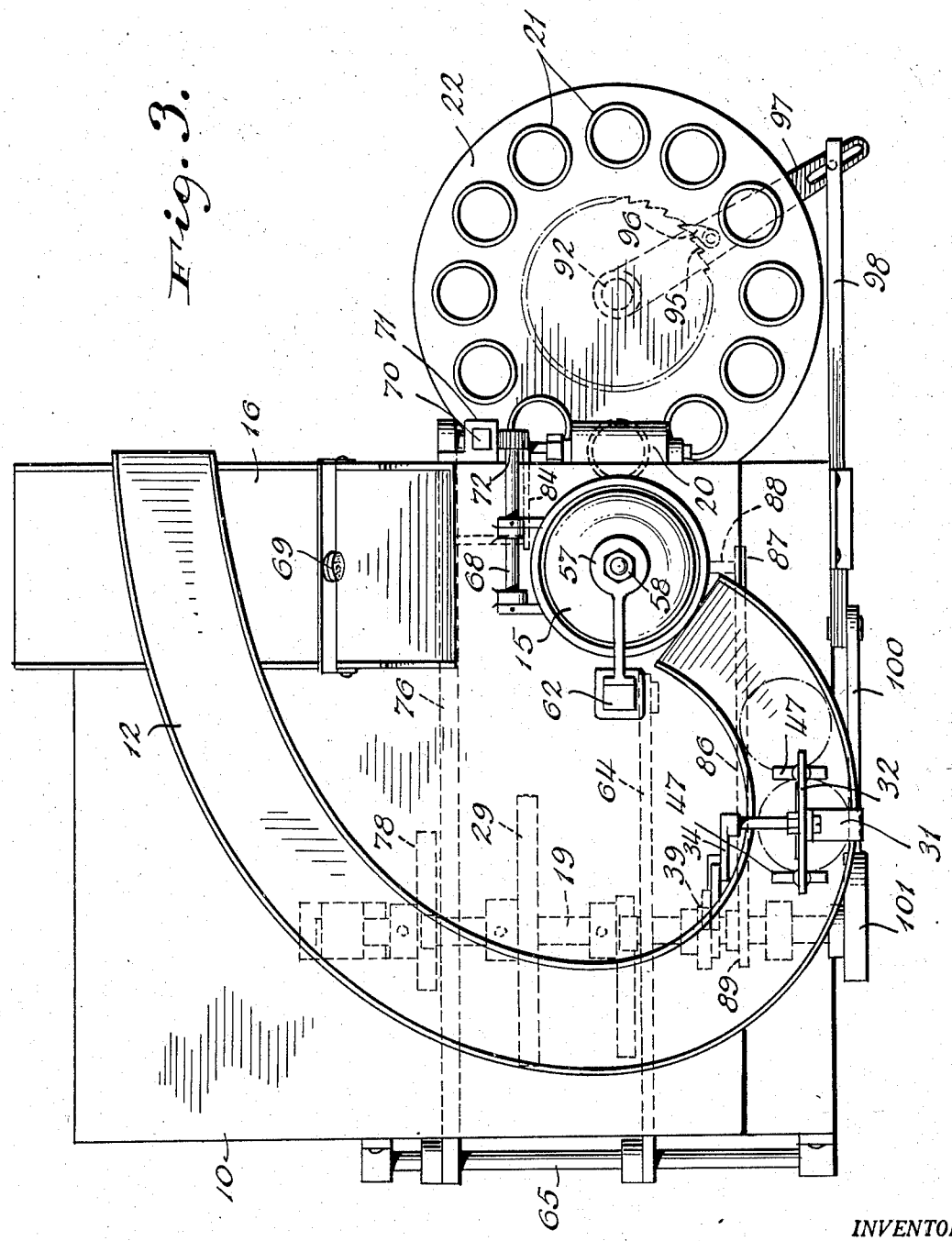
Fig. 3 is a top plan view.

The escapement mechanism 13 is supported by a bracket 31, near the outer or delivery end of the chute 12, and is controlled from the shaft 19 in such manner that when the parts are operated from the position of Fig. 1 a single fruit will be released from the chute so that it will fall into the compressor element 14. Said mechanism comprises a rocker arm 32 pivoted intermediate its ends at the upper end of the bracket 31 and having connected to its pivot 33 a link 34 to which is joined the upper end of a rod 35. The lower end of said rod 35 is connected to one end of the rocker arm 36 supported by the frame work 10, and joined to the other end of said arm 36 is a link 37 the lower end of which carries a roller 38 having a bearing in a cam 39 fixed upon the shaft 19. Horizontally disposed and adjustable cross arms 40 are secured at 41 adjacent the upper end of the bracket 31 and the outer extremities of said arms are provided with guides 42 in which are vertically slidable rods 43, 44 having pin and slot connections 45 at their upper ends with the rocker 32. Each of the rods, 43, 44 is made in two sections and the latter are joined by a coupling 46 which permits of adjustment of the length of the rod. This adjustment, together with that of the arms 40, permits the escapement mechanism to be adapted to fruits of different sizes. The lower ends of the rods 43, 44 terminate in yokes 47 carrying rollers 48 for alternate engagement with fruit as it is fed downwardly in the chute 12. As shown in Fig. 2, the rod 44 is lowered so that its roller 48 is positioned in the path of a fruit 49 to prevent further progress of said fruit toward the compressor element 14. When the escapement mechanism is operated by the cam 39, the rod 44 is raised and the rod 43 lowered so that the roller of the latter rod will prevent movement down the chute of the fruit in back of the piece of fruit 49, and the raising of the rod 44 will release the latter piece of fruit so that it will roll down the chute and into the element 14. Then, upon the restoration of the escapement mechanism to the position of Fig. 2, the raising of the rod 43 permits the next piece of fruit to roll until it contacts the roller 48 of the rod 44.

The fruit released from the chute 12 by the escapement mechanism enters the element 14 the body of which is cylindrical in formation and is provided with a perforated bottom 50 which is centrally depressed to form a cavity 51 to better center the fruit within said element preparatory to its compression. Said element is seated in its operative position upon the upper end of a stationary funnel 52 the lower end of which is detachably connected to the reservoir 17 by wing bolts 53. When a fruit has been deposited into the element 14 the vertically movable compressor element 15 is lowered, in a manner to presently appear, to cut and compress said fruit so that the juice will be extracted therefrom and flow through the perforated bottom 50 into the reservoir 17. The element 15 is formed as a projecting compressing head 54 which carries a knife 55 that cuts the fruit as it is being compressed so as to facilitate extraction of the juice. Said element is further provided with a rod 56 which extends upwardly therefrom and through a sleeve 57, the upper end of said rod being threaded to receive the securing nuts 58. A collar 59 is provided on the rod within the sleeve 57 and interposed between said collar and the closed upper end of the sleeve 57 there is provided a coil spring 60 which forms a resilient cushion for the element 15 as the latter is compressing the fruit between it and the bottom 50. The sleeve 57 is connected by a bracket 61 to the vertically movable slide 62 supported in a guide 63 mounted on the frame 10. The lower end of the slide 62 has a pin and slot connection with one end of an arm 64 pivotally mounted at 65 on the frame 10 and carrying, intermediate its ends, a roller 66 adapted for engagement with the groove of a cam 67 mounted on the shaft 19 and rotatable therewith. Said cam is so positioned upon the shaft that the arm 64 will start its downward movement about the pivot 65 directly after a fruit has been deposited into the element 14 and after the extraction of the juice from said fruit has been accomplished the cam again raises the arm 64 to withdraw the element 15 from engagement with the compressed fruit. At the conclusion of this operation the element 14 containing the compressed fruit is swung about its pivot 68 to the dotted line position of Fig. 1 where said element contacts a bumper 69 mounted on the discharge chute 16. The element 14 strikes said bumper with considerable force and in this manner dislodges the compressed fruit from said element so that it will fall into said chute, after which the element 14 is restored to the full line position of Fig. 1. This operation is accomplished through the medium of a vertically movable rack bar 70 slidably mounted in a guide 71 carried by the frame 10 with the teeth of said bar engaging a pinion 72 fixed on the pivot 68 of the element 14. The lower end of the bar 70 terminates in a guide 73 in which is disposed a block 74 having springs 75 disposed on opposite sides thereof to act as shock absorbers when the element 14 strikes the bumper 69 and is returned to its operative position on top of the funnel 52. Said block 74 is carried by one end of a long arm 76 the other end of which is mounted upon the pivot 65 and, intermediate its ends, said arm carries a roller 77 engageable with a cam 78 on the shaft 19. Said cam controls the movement of the arm 76 so as to swing the element 14 toward its discharge position after the element 15 has been raised, and immediately upon the discharge of the compressed fruit said arm 76 then operates to return the element 14 to its original position.

The movements of the arm 76 about its pivot 65 are also utilized to control the discharge of a measured quantity of juice from the reservoir 17 through the medium of the valve structure 20 into one of the receptacles 21 on the turntable 22. Said valve structure 20 comprises a cylindrical, horizontally disposed body attached to the lower end of the reservoir 17 and communicating with an outlet 79 in said reservoir. A sleeve valve 80 is mounted for oscillation within the body 20 and has an opening 81 therein which alternately registers with the outlet 79 and the discharge nozzle 82 in the valve body. With the valve in the position of Fig. 4 and the reservoir 17 filled with juice above the level of the outlet 79, the valve 80 will receive a predetermined amount of the juice from the reservoir and when said valve is turned in one direction, as will presently appear, further communication with the reservoir will be temporarily closed and at the termination of said movement of the valve its opening 81 will be registered with the outlet 82 in such manner as to permit the juice contained in said valve to flow into a receptacle 21, whereupon the valve 80 is turned in the opposite direction to again register its opening 81 with the outlet 79 so that the valve will again be filled. To accomplish this operation, the valve 80 is provided with a rod 83 extending from one end of the body 20 and connected to one end of an operating arm 84 the other end of which has a pin and slot connection 85 with the arm 76 so that as said arm is operated by its cam 78 the operating arm 84 will oscillate to impart a similar movement to the valve 80.

During the various operations thus far described the agitator 18 within the reservoir 17 is constantly rotated by an endless belt 86 extending about a pulley 87 on the shaft 88 of said agitator and also around a pulley 89 on the shaft 19.

After a receptacle 21 has been filled with juice from the valve 80 the turntable 22 is advanced one step to position a succeeding receptacle 21 beneath the nozzle 82 preparatory to a discharge of another measured quantity of juice from the reservoir. For this purpose the turntable 22 is rotatably supported in a bracket 90 having a bearing portion 91 through which extends the depending shaft 92 of said turntable. A plate 93 is carried by the lower end of the shaft 92